(12) United States Patent  
Chiarenza

(10) Patent No.: US 6,841,916 B2
(45) Date of Patent: Jan. 11, 2005

(54) AXIAL FLUX ELECTROMOTIVE GENERATOR HAVING ROTOR MAGNETS AND SHAPED CORE ASSEMBLY

(76) Inventor: Kevin J. Chiarenza, 822 ½ 27th St., San Pedro, CA (US) 90731

( * ) Notice: Subject to any disclaimer, the term of this patent is extended or adjusted under 35 U.S.C. 154(b) by 48 days.

(21) Appl. No.: 10/457,318

(22) Filed: Jun. 10, 2003

(65) Prior Publication Data

US 2004/0251767 A1 Dec. 16, 2004

(51) Int. Cl.[7] .......................... H02K 1/16; H02K 21/12
(52) U.S. Cl. ................. 310/254; 310/216; 310/156.56; 310/268
(58) Field of Search ................ 310/216–218, 310/254, 267, 268, 156.56

(56) References Cited

U.S. PATENT DOCUMENTS

| | | | | | |
|---|---|---|---|---|---|
| 1,863,294 | A | * | 6/1932 | Bogia | 310/46 |
| 3,700,942 | A | * | 10/1972 | Alth | 310/164 |
| 3,762,042 | A | * | 10/1973 | Abe et al. | 29/598 |
| 4,358,693 | A | * | 11/1982 | Palmer et al. | 310/46 |
| 4,371,801 | A | * | 2/1983 | Richter | 310/156.36 |
| 5,117,141 | A | * | 5/1992 | Hawsey et al. | 310/114 |
| 5,977,684 | A | * | 11/1999 | Lin | 310/268 |
| 6,552,460 | B2 | * | 4/2003 | Bales | 310/156.35 |
| 6,750,588 | B1 | * | 6/2004 | Gabrys | 310/268 |

* cited by examiner

*Primary Examiner*—Tran Nguyen
(74) *Attorney, Agent, or Firm*—Irving Keschner

(57) ABSTRACT

An improved electric motor design wherein the stator and rotor configuration is arranged to produce a core flux efficiently shaped and utilized to enhance motor torque without substantially increasing the electrical power furnished to the motor. The internal surface of the stator, or coil, has a plurality of corrugations and annular grooves formed therein and a corresponding number of rotor disks having permanent magnets secured to the outer surface, the permanent magnets being positioned to rotate within the grooves. The magnets are opposed in polarity disk to disk as well as being offset about the circumference so that one disk set will align with one set of corrugations and the other disk set align with the pole face created by the intersection of the corrugations and the adjacent annular grooves. Energizing the motor coil with alternating current causes the magnets and their associated disks to reposition themselves in a manner that causes the motor shaft to rotate as well as shaping the core flux field for more efficient use thereby increasing motor torque.

4 Claims, 5 Drawing Sheets

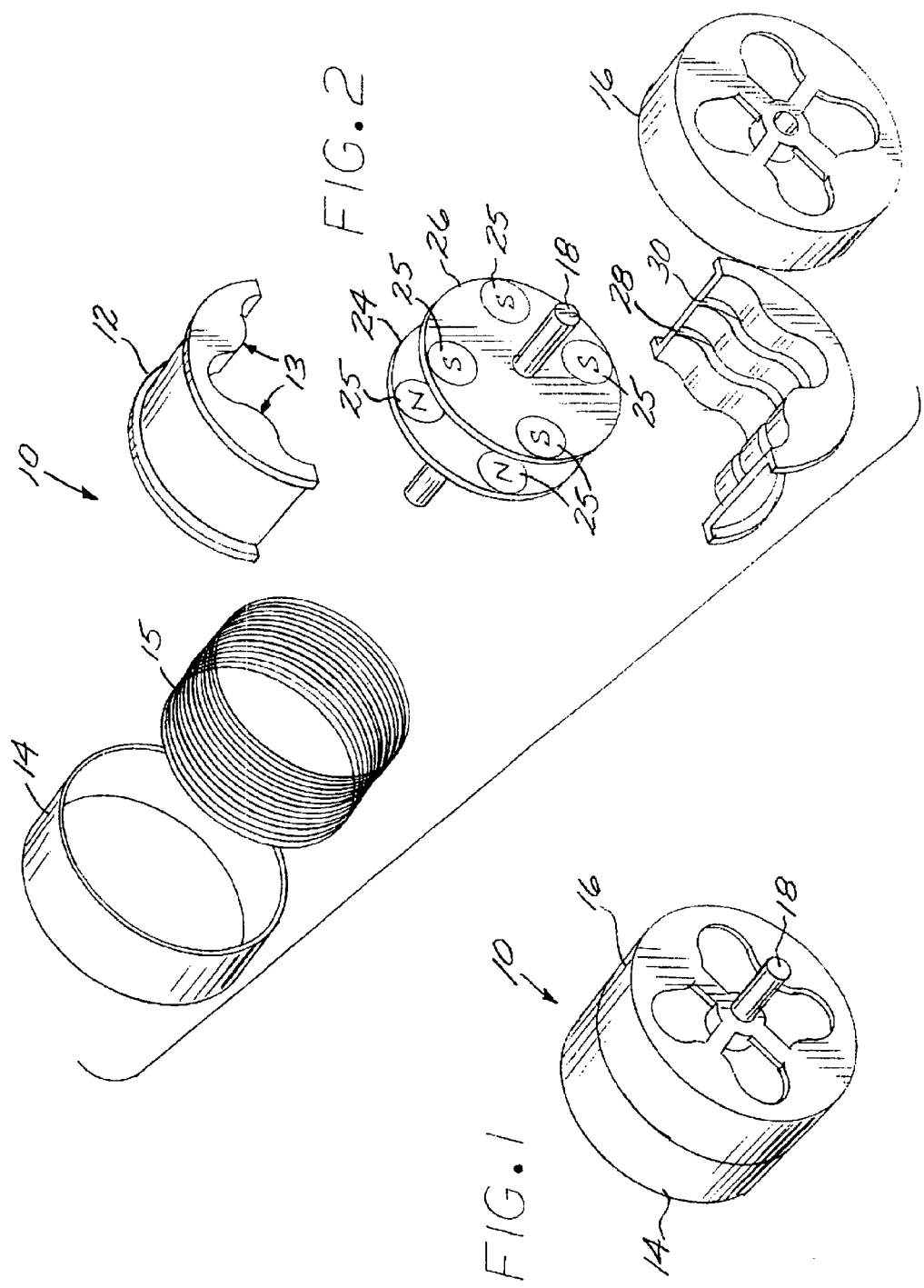

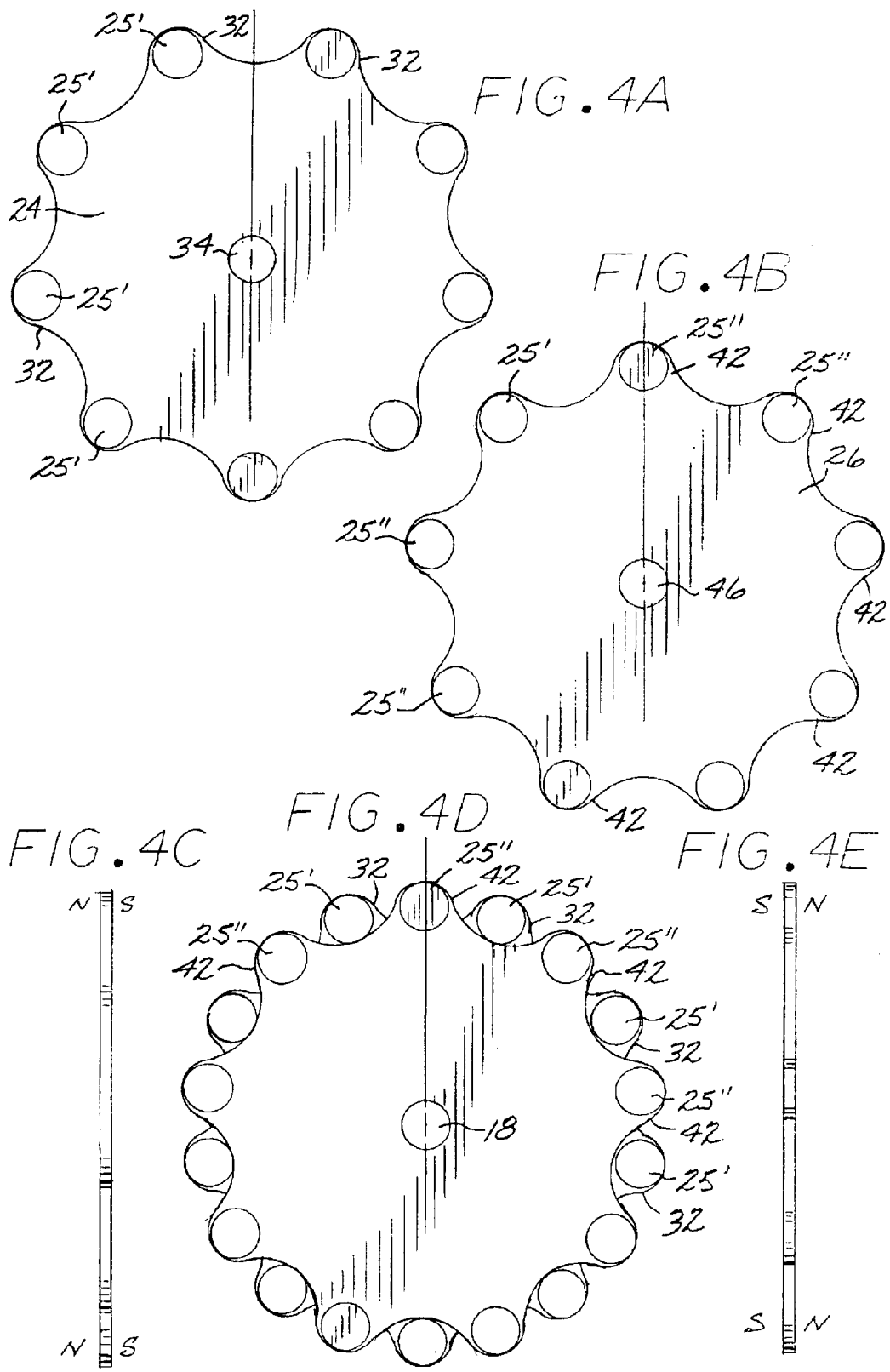

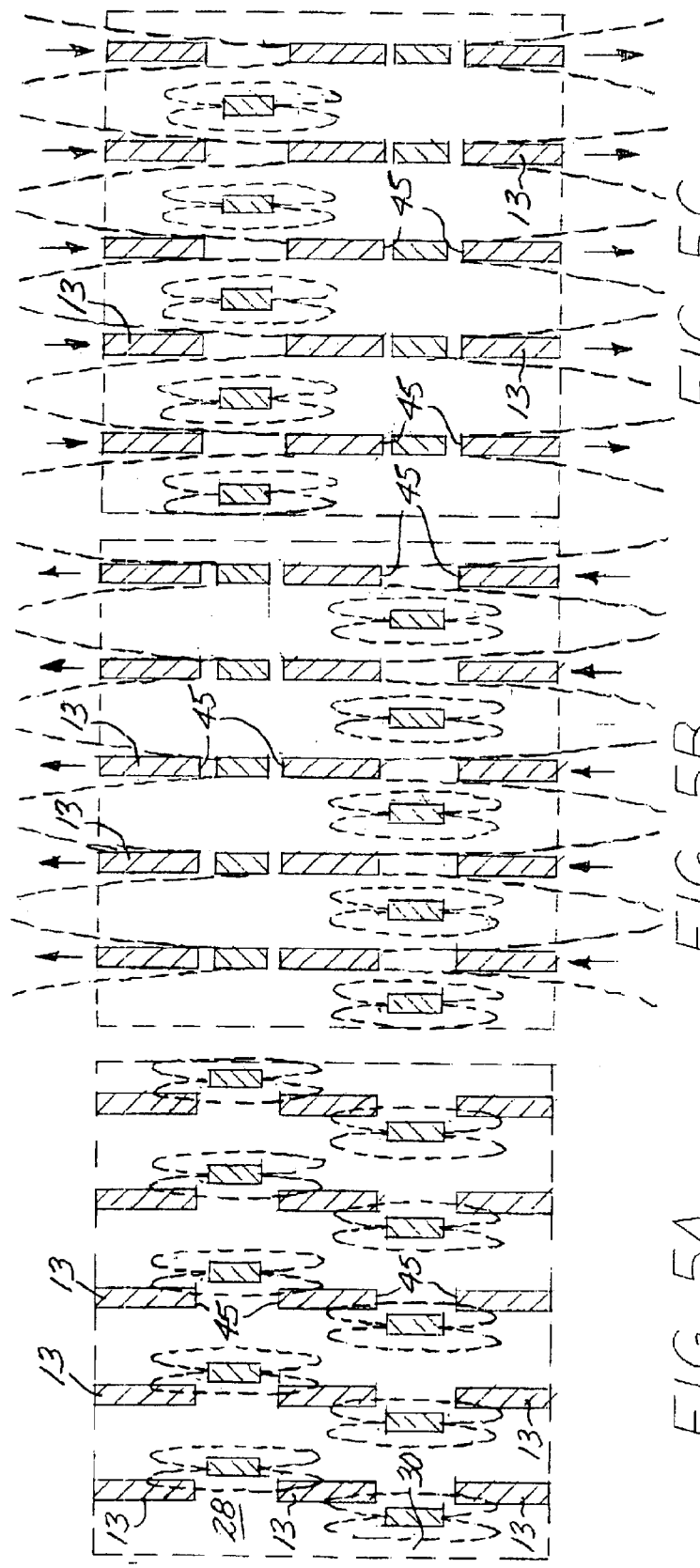

US 6,841,916 B2

AXIAL FLUX ELECTROMOTIVE GENERATOR HAVING ROTOR MAGNETS AND SHAPED CORE ASSEMBLY

BACKGROUND OF THE INVENTION

1. Field of the Invention

The present invention provides an axial flux, electromotive generating device that includes rotor having a plurality of magnets mounted thereto and a stator core assembly having a plurality of annular grooves and corrugations formed along the width of the stator.

2. Description of the Prior Art

Axial flux electromotive generating devices have been widely described in the prior art. For example, U.S. Pat. No. 6,445,105 to Kliman et al describes such a device having a rotatable shaft, a rotor disk coupled to the shaft, a permanent magnet supported by the rotor disk, a stator extension positioned in parallel with the rotor disk, two molded iron pole elements attached to the stator extension and facing the permanent magnet and two electrical coils wrapped around the corresponding two molded iron pole elements.

U.S. Pat. No. 6,323,576 to Applegate discloses an electromotive generator which ulitizes a plurality of stator members, each stator member including a coil and top and bottom element separated by a gap. The top and bottom elements each include a face. The generator further includes a rotor having a plurality of magnets. The rotary is rotatably mounted, such than the plurality of magnets pass within the gaps in the stator members when the rotor is rotated with respect to the stator. The magnets have a shape substantially equal to the shape of the stator member faces. Each of the magnets overlap the stator faces as the rotor rotates such than the area of overlap and non-overlap of each of the magnets changes non-linearly.

What is thus desired is to provide an improved electric motor which is less expensive, simplified in construction and wherein increased torque is produced as the stator coil is energized and wherein more efficient utilization of field interactions by actively shaping the fields as well as reacting to it is provided.

SUMMARY OF THE INVENTION

The present invention provides an improved electric motor design wherein the stator and rotor configuration is arranged to produce a core flux efficiently shaped and utilized to enhance motor torque without substantially increasing the corresponding electrical power furnished to the motor.

The internal surface of the stator, or coil, has a plurality of corrugations and annular grooves formed therein along the longitudinal axis of the stator and rotor disks having permanent magnets secured to the outer surface of the disks, the disks rotating within the annular grooves. The magnets are opposed in polarity disk to disk as well as being offset about the disk circumference along the stator longitudinal axis so that one disk set will align with one set of corrugations and the other disk set aligned with the adjacent groove wall.

Energizing the motor coil with alternating current causes the magnets and their associated disks to reposition themselves in a manner that causes the motor shaft to rotate as well as shaping the core flux for more efficient use thereby increasing motor torque.

DESCRIPTION OF THE DRAWINGS

For a better understanding of the present invention as well as other objects and further features thereof, reference is made to the following description which is to be read in conjunction with the accompanying drawing therein:

FIG. 1 is a perspective view of the electric motor of the present invention;

FIG. 2 is an exploded assembly view of the electric motor shown in FIG. 1;

FIGS. 4A–4E are simplified views illustrating a rotor disk configuration and the alternating permanent magnet arrangements;

FIGS. 5A–5C illustrate the efficient shaping and utilization of the core flux.

DESCRIPTION OF THE INVENTION

Figure 3A:
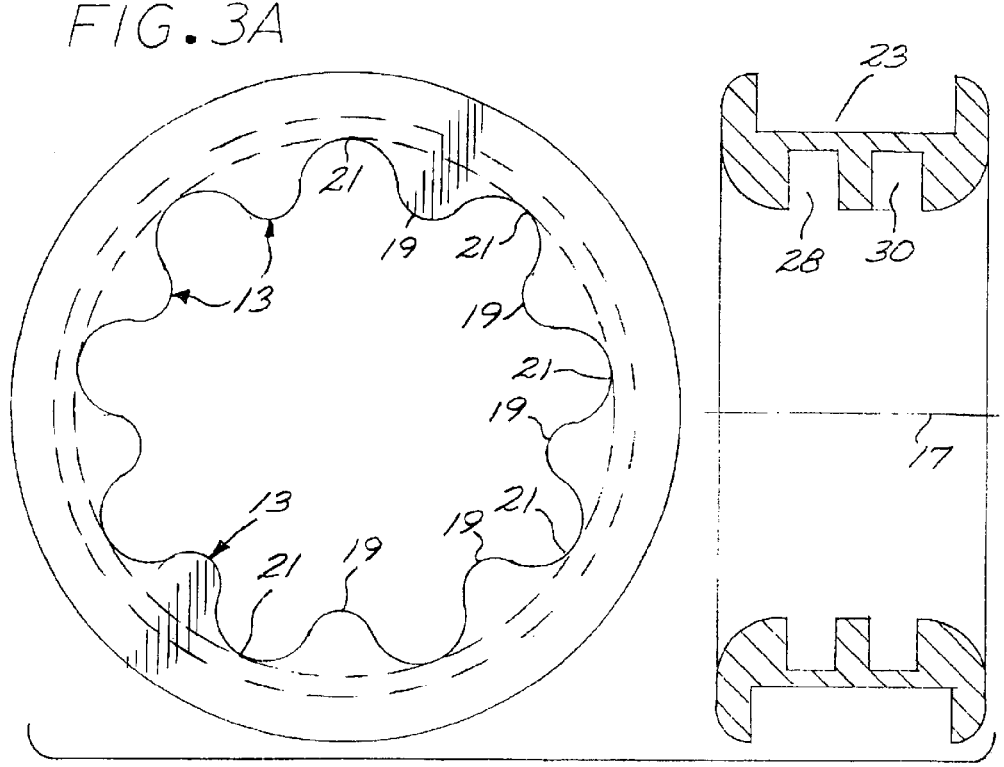
FIG. 3A illustrates side and front views of the stator component of the motor of the present invention.

Referring now to FIG. 1, a simplified perspective view of the major structural components of the improved electric motor 10 of the present invention is illustrated. In particular, motor 10 comprises bearing support and core sleeves 14 and 16 and shaft member 18.

FIG. 2 is an exploded view illustrating the components forming the electric motor 10 of the present invention. In particular, motor 10 comprises cylindrical stator core 12, made of ferromagnetic material, having a series of corrugations 13 and a plurality of annular grooves formed therein, (only annular grooves 28 and 30 are illustrated) end caps, or bearing support and core sleeves 14 and 16, coil 15, and a plurality of rotor disks (only rotor disks 24 and 26 are illustrated) having a plurality of permanent magnets 25 embedded around the circumference of each rotor disk. The number of rotor disks utilized in motor 10 corresponds to the number of annular grooves formed along the internal circumference of core 12.

Figure 3B:
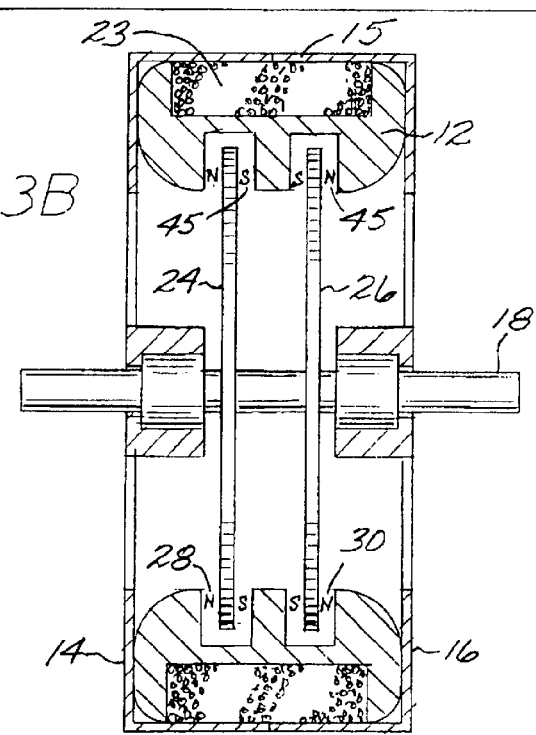
FIG. 3B is a side sectional view illustrating the motor core structure.

FIGS. 3A and 3B illustrate in detail the construction of cylindrically shaped core 12, core 12 being fabricated from ferromagnetic material and having a notched area 23 for supporting stator coil 15. A plurality of corrugations 13 are formed about a circumference and along the longitudinal axis 17 within the interior surface of core 12. As shown in FIG. 3A, grooves 28 and groves 30 extend about the interior surface of core 12. In the embodiment shown, nine annular corrugations 13 extend around the interior surface of core 12. The corrugations 13 create areas of higher and lower permeability. Although applicant has chosen to utilize the term "corrugations" to describe the interior surface configuration of stator 12, the interior surface configuration can also be described as a series of alternate peaks 19 and valleys 21.

The construction of rotor disks 24 and 26 are shown in more detail in FIGS. 4A–4E. Referring to FIG. 4A, rotor disk 24 comprises a plurality (nine in the embodiment illustrated) of protrusions 32 extending from the disk circumference. A corresponding number of permanent magnets 25' are embedded in protrusions 32 in a conventional manner. An aperture 34 is formed in rotor disk 24, aperture 34 being sized to allow shaft 18 to extend therethrough. For reasons set forth hereinafter, magnets 25' are embedded in disk 24 in a manner such that the polarities are as shown in FIG. 4C. Rotor disk 26 is constructed in an identical manner and, as shown, comprises a plurality of protrusions 42 extending from the circumference of disk 26, a plurality of permanent magnets 25" embedded in protrusions 42, and an aperture 46 sized to allow shaft 18 to extend therethrough. Magnets 44 are mounted to disk 26 in a manner such that the polarities thereof are as illustrated in FIG. 4E.

Rotor disks 24 and 26 are mounted on shaft 18 such that magnet bearing protrusions 32 and 42 are offset as illustrated in FIG. 4D, the rotor disk 24 magnets being aligned with peaks 19 and the rotor disks 26 magnets being aligned with valleys 21.

The bearing support and core sleeves 14 and 16, when assembled together, form the outer surfaces of motor 10. Core member 12 is shaped to hold the stator coil 15 as well as forming the plurality of core grooves. The rotor disks 24 and 26 (although two are illustrated, one or more than two rotors can be utilized) are located in the annular grooves within the core member 12 (pairs of rotors are preferably for shaping the flux path in a manner to provide the advantage provided by the motor construction of the present invention), and fixedly mounted to shaft 18.

The magnets are opposed in polarity disk to disk as well as being offset about the circumference so that one disk set will align with the corrugations 13 and the other disk set align with pole face 45 as shown in FIG. 3B, pole face 45 being created by the intersection of the corrugations 13 and annular grooves. Pole face 45 causes the rotor disk magnets 25' and 25" to be aligned with, or repelled therefrom, and, as a result, cause shaft 18 to rotate.

During operation, coil 15 is energized with an alternating current thereby alternating (or reversing) the core magnetic field direction. As the core field alternates in polarity, alternate sets of magnets are attracted to or repelled from the pole faces 45 created at the intersection of a corrugation 13 and an adjacent annular groove. In particular, magnet sets that are in polarity with the core field will be attracted to the pole faces 45; magnet sets in reverse polarity will be repelled away from the pole faces 45 to the formed areas of lower permeability.

As the magnets being repelled move to an area of lower permeability, an added benefit is that the core field is forced out and away from themselves and into the area of the pole face, increasing the number of flux lines available for an attractive force at the pole face 45. Conversely, magnets being attracted to pole faces 45 will also draw field lines into themselves and away from the repelled magnets.

In this manner, the shape of the core field and the positioning of the magnets provide a more efficient utilization of field interactions (motive force) by actively shaping the fields as well as reacting to it. This high field interaction and ease of construction provided by the present invention enables multiple motor types (drum, disk or cylinder) to be constructed by maintaining the basic core geometry while the motor diameter, thickness and length parameters can be varied.

Referring now to FIGS. 5A–5C (the views are cutaways along an axis perpendicular to longitudinal axis 17), FIG. 5A illustrates the core flux produced within the interior of the core assembly 12 with the coil 15 unenergized and thus not producing coil field lines.

FIG. 5B shows the core flux resulting when the coil 15 is energized. In this case, the coil field lines congregate towards the peaks 19 of the stator core 12, the areas of higher permeability. One set of rotor disk magnets are aligned with the pole faces 45, the aligned magnets in turn pulling the field lines towards the stator peaks 19. Magnets in opposition to the coil field lines move to the valleys 21 (areas of lower permeability) which also forces the coil field lines towards the stator peaks 19. FIG. 5C illustrates the core flux when the coil current and field polarity reverse, rotation being achieved as the magnets realign to maintain field balance within the structure of coil 12.

Figure 6A:
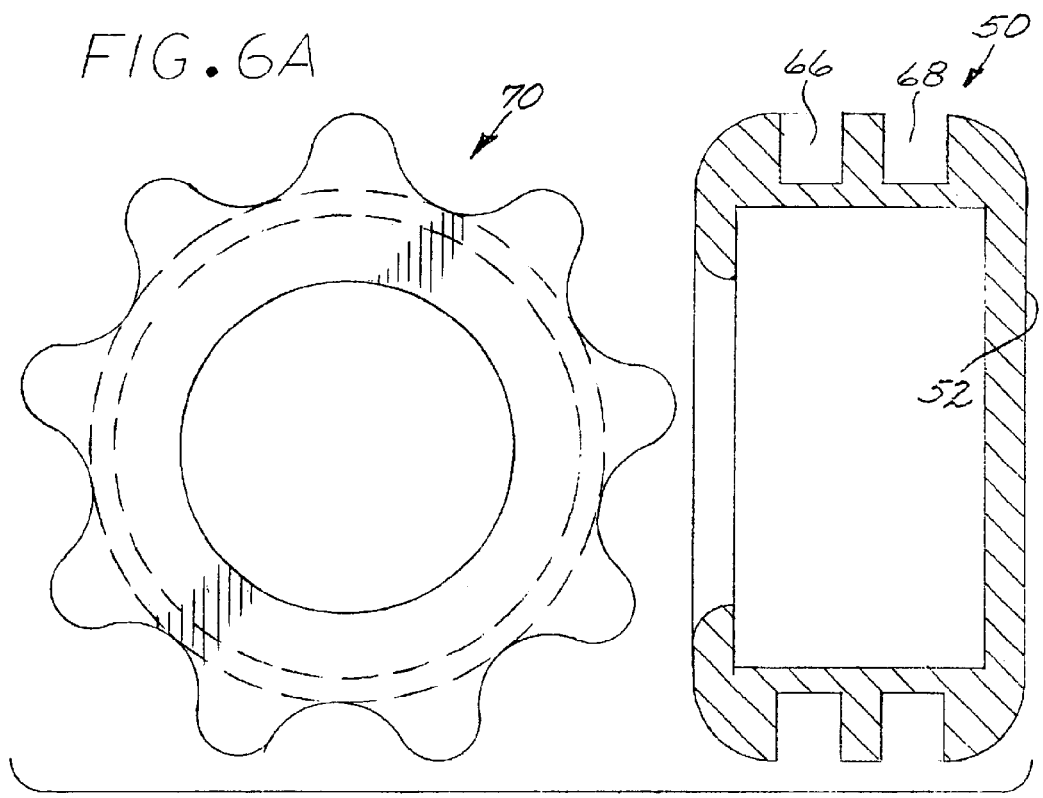
FIGS. 6A and 6B illustrate a second embodiment of the present invention.
Figure 6B:
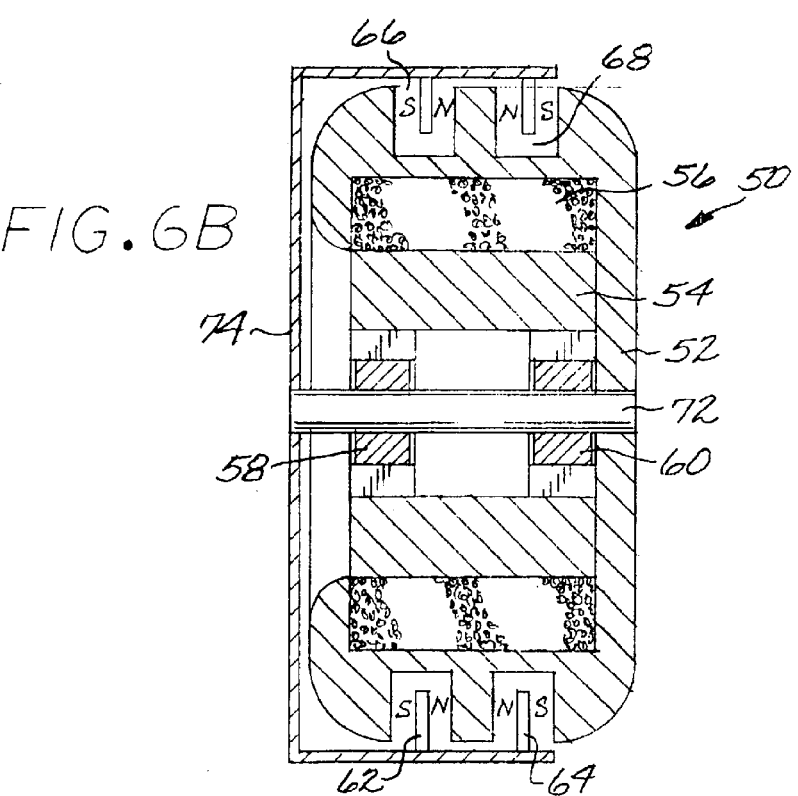

FIGS. 6A and 6B illustrate an alternate embodiment of the present invention. In essence, the components and operation of this embodiment is identical to that shown in FIGS. 1–5 but the position of the annular core grooves and stator coil are arranged "inside-out". This configuration provides a smaller sized motor 50 required in specific applications. Motor 50 comprises core 52, bearing support 54, coil 56, bearings 58 and 60, permanent magnets 62 and 64 formed on rotor disk 70 (two rotor disks are utilized in the embodiment illustrated), annular grooves 66 and 68, shaft 72 and end cap 74.

The present invention thus provides an improved motor construction wherein the stator is designed such that the repositioning of the rotor disks, in addition to causing the motor shaft to rotate, also shapes the core flux field, thus increasing motor efficiency and torque output.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. An axial motor having a longitudinal axis and comprising a stator member having external and internal surfaces, said external surface having a notch portion for receiving a coil positioned therein, said internal surface having first and second corrugations formed along said longitudinal axis and a first annular groove positioned between said first and second corrugations; and a first rotor disk having a first set of a plurality of magnets formed in the circumference thereon, said magnets passing within said first annular groove when said rotor is rotated with respect to said stator.

2. The axial motor of claim 1 further including a second rotor disk having a second set of a plurality of magnets, said internal surface of said stator member having a second annular groove, said second set of magnets passing within said second annular groove when said second rotor is rotated with respect to said stator.

3. The axial motor of claim 2 wherein said first and second disk rotors are adjacent to each other, said first set of plurality of magnets are opposed in polarity to said second set of plurality of magnets.

4. The axial motor of claim 3 wherein said first set of plurality of magnets is offset from said second set of plurality of magnets.

* * * * *